Oct. 25, 1927.
W. P. REAVES
1,647,017
OPTICAL APPARATUS
Filed Aug. 1, 1925
7 Sheets-Sheet 1
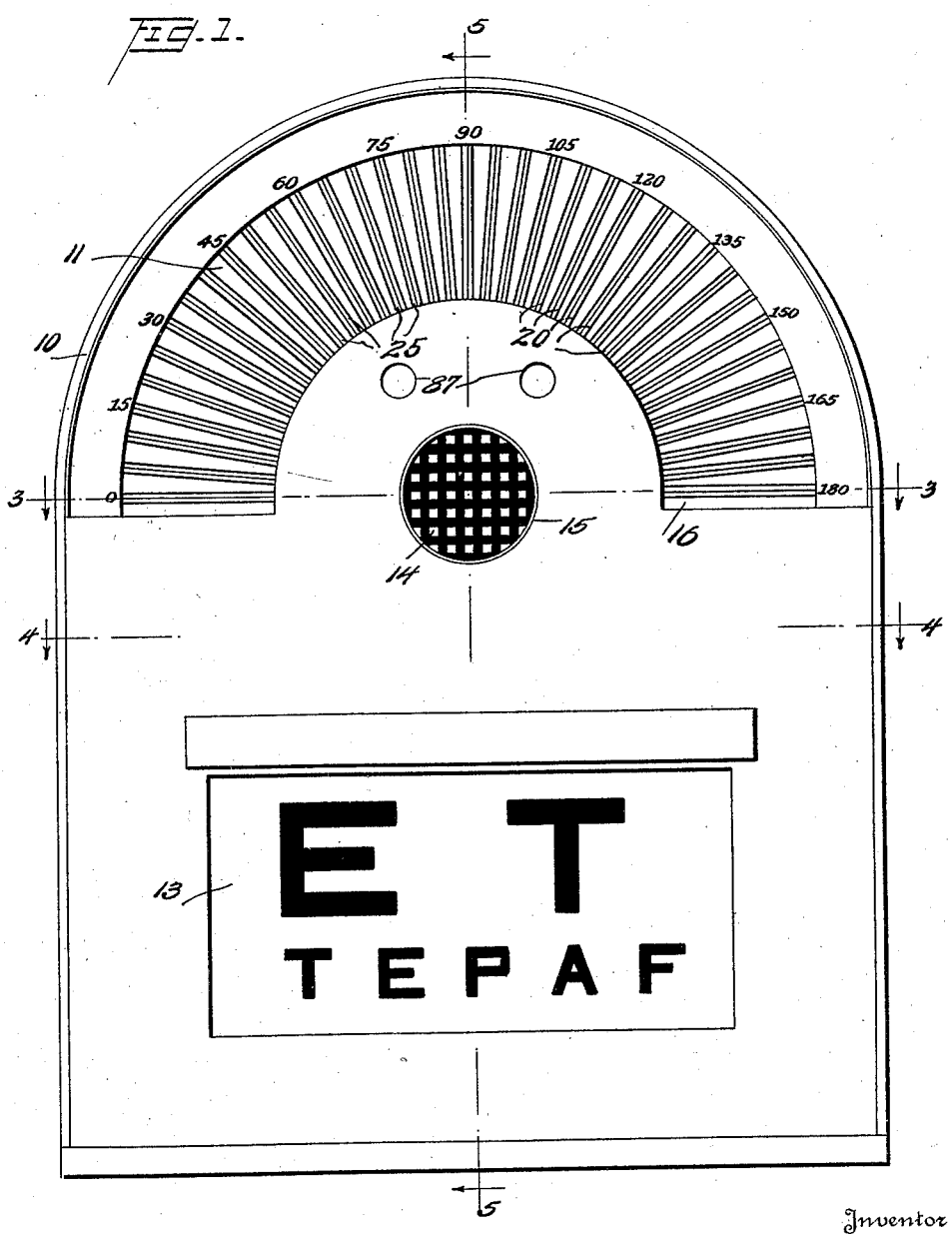

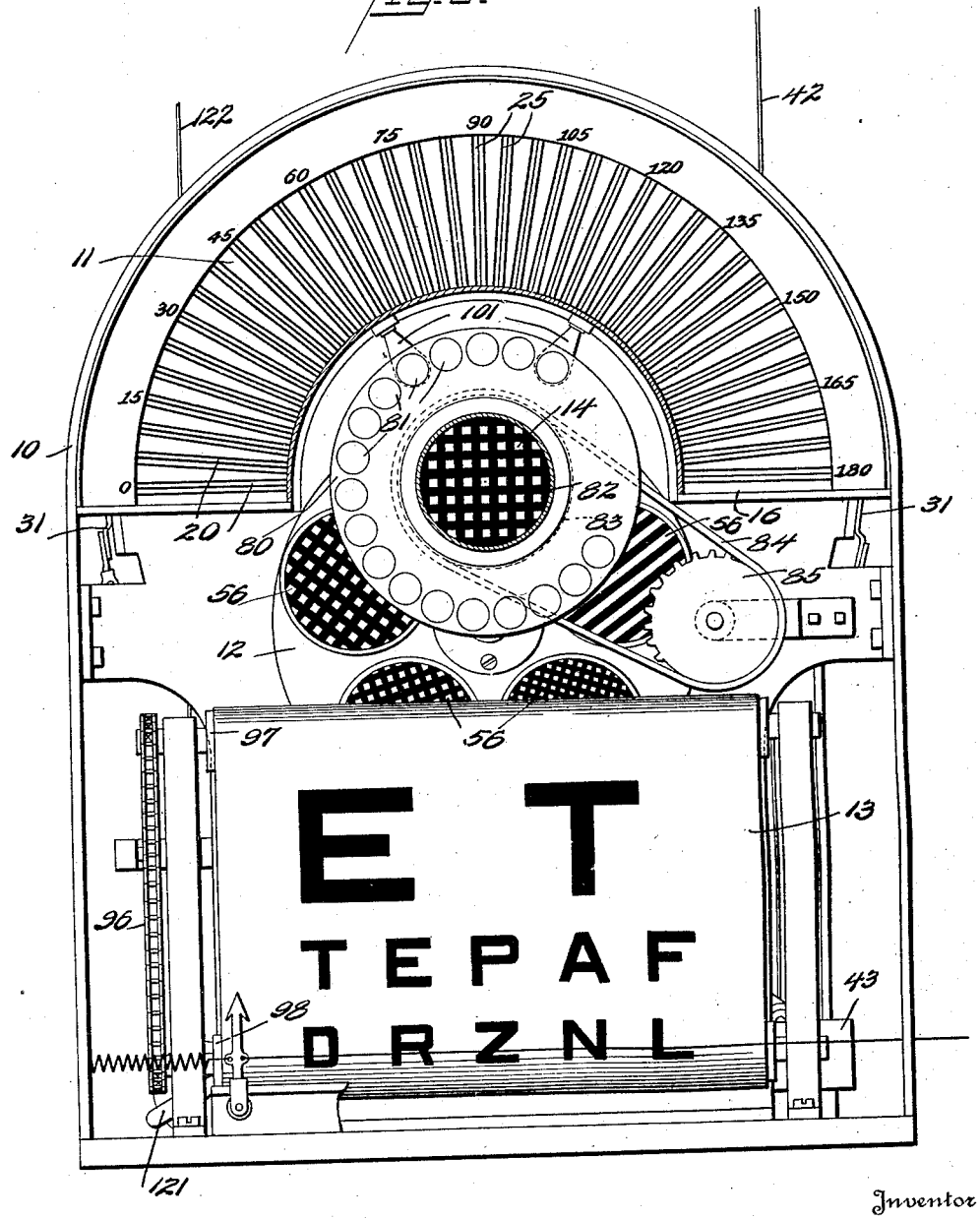

Oct. 25, 1927.
W. P. REAVES
1,647,017
OPTICAL APPARATUS
Filed Aug. 1, 1925
7 Sheets-Sheet 3
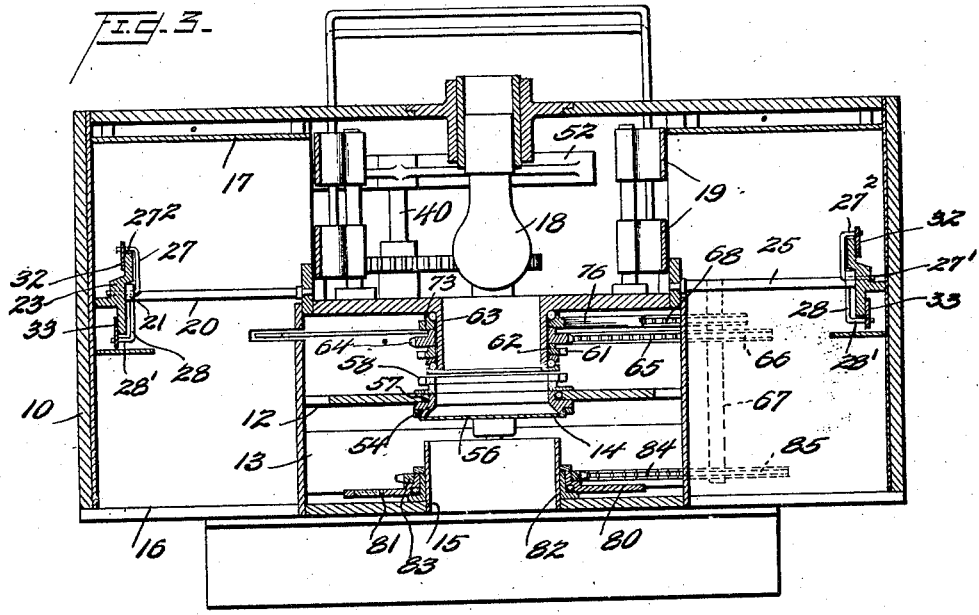
Inventor
Wm. P. Reaves,
By Watson, Coit, Moser
& Grindle
Attorney

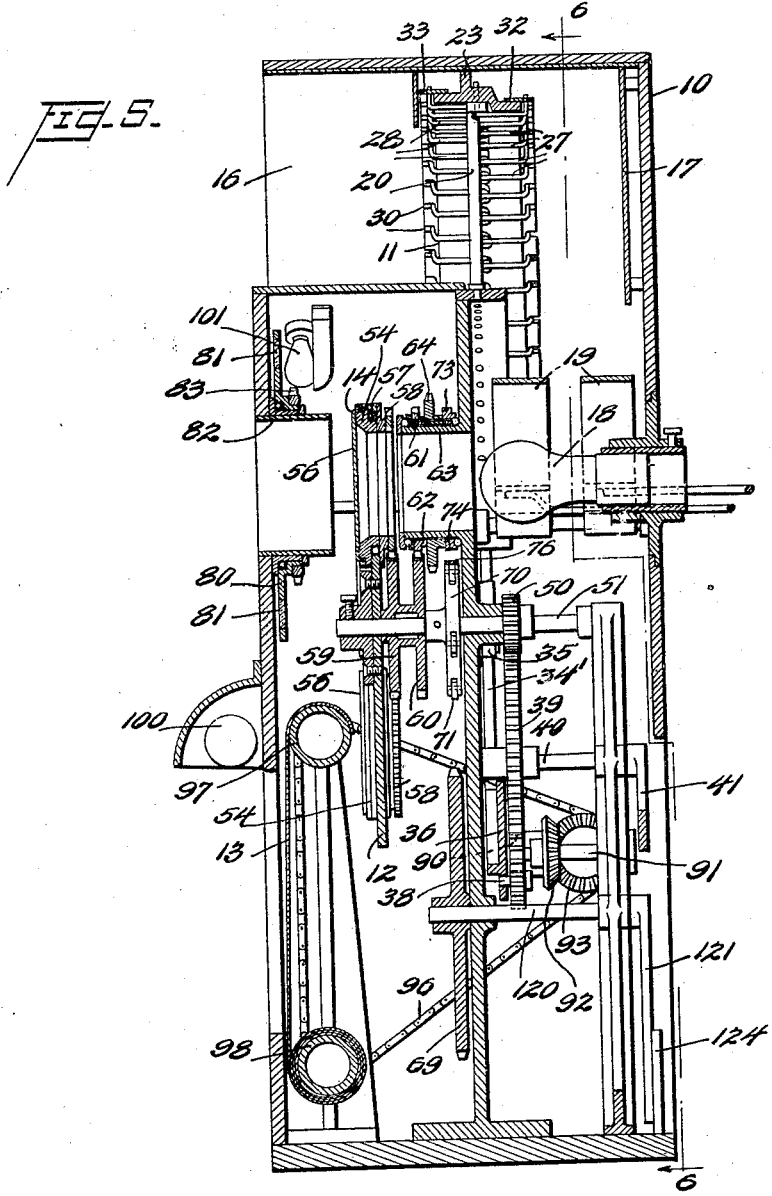

Oct. 25, 1927.

W. P. REAVES 1,647,017

OPTICAL APPARATUS

Filed Aug. 1, 1925     7 Sheets-Sheet 5

Inventor

Wm. P. Reaves,

By Watson, Coit, Morse & Grindle,

Attorney

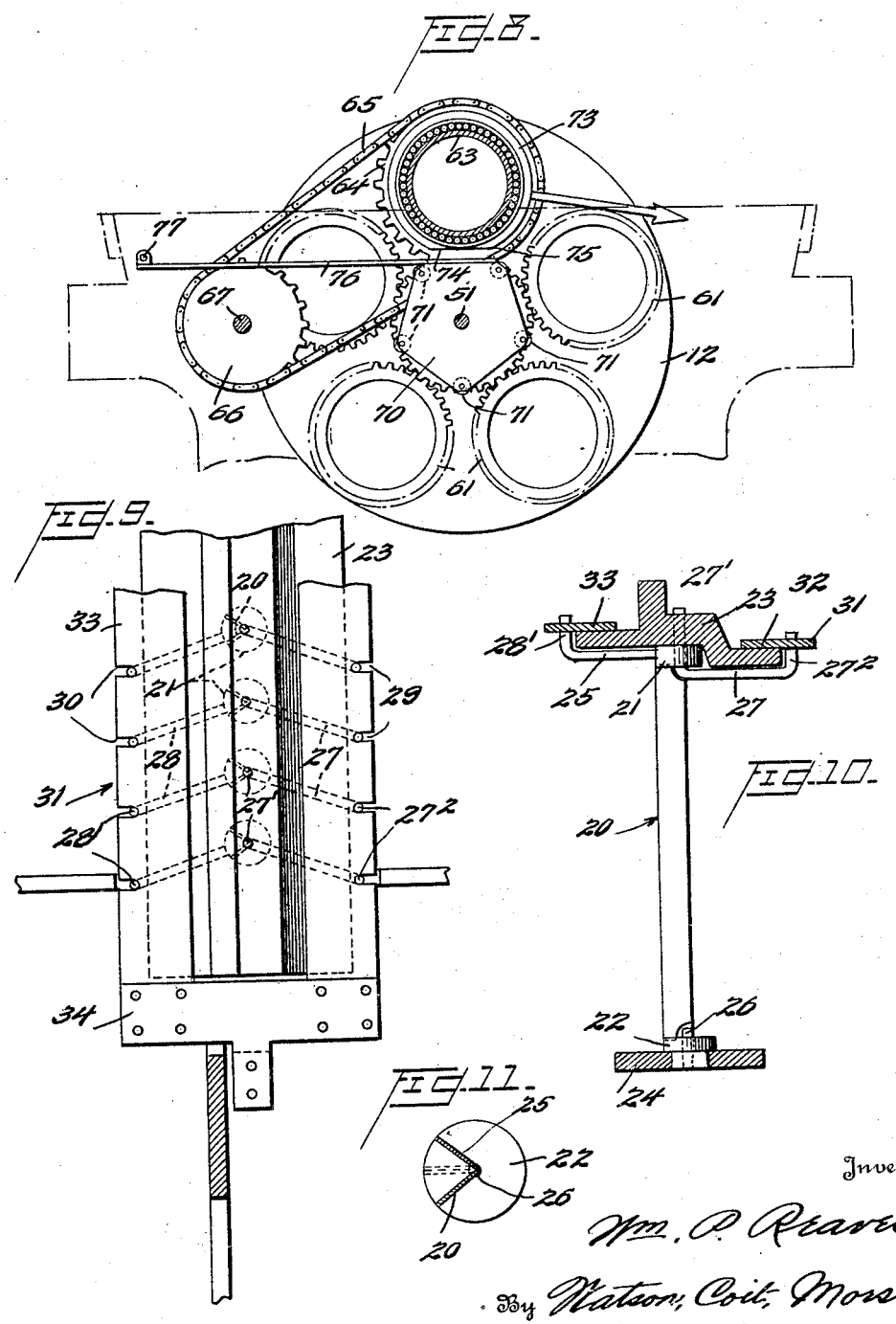

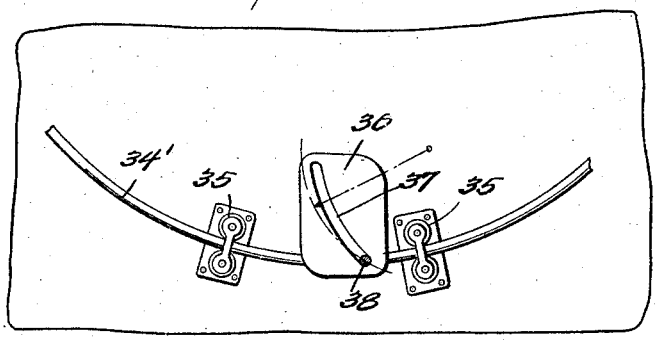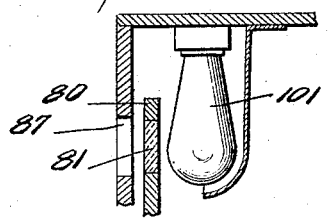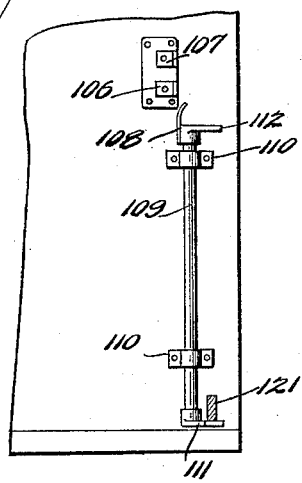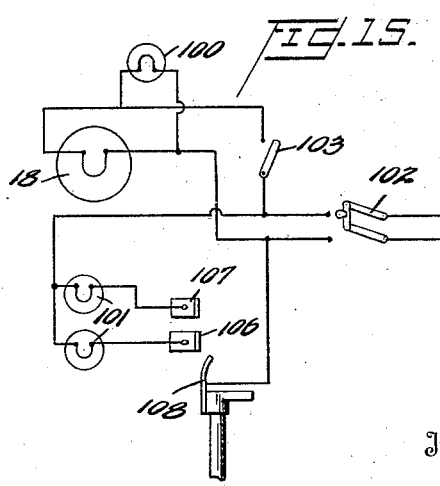

Patented Oct. 25, 1927.

1,647,017

UNITED STATES PATENT OFFICE.

WILLIAM P. REAVES, OF GREENSBORO, NORTH CAROLINA.

OPTICAL APPARATUS.

Application filed August 1, 1925. Serial No. 47,597.

The present invention relates to optical apparatus, and particularly to eye testing apparatus of the type disclosed in my co-pending application Serial No. 589,463, filed September 20, 1922, and in my Patent No. 1,507,715, granted September 9, 1924.

In the application referred to an apparatus of the cabinet type for testing visual acuity is illustrated and described in detail. By means of such apparatus a patient may be subjected to a series of tests of vision by means of elements of a general type well known to refractionists. Among these elements, which are enclosed in a casing provided with view apertures, is a chart having letters or objects inscribed thereon of different size as measured in visual acuity units, a meridian or astigmatic dial, and a rotatable astigmatic chart, these several elements being associated in a novel combination and being adapted to be controlled by the examining refractionist from a point distant from the instrument. By the specific control means provided they may be operated simultaneously or in conjunction with each other. The apparatus also includes novel lighting means for illuminating the test objects.

In the present invention the general arrangement of parts of my prior invention is retained and also the apparatus remains unchanged in many details. On the other hand, I have made numerous changes and improvements in the present invention which tend to promote speed and accuracy in testing a patient's eyes and which render the apparatus more perfect mechanically. These changes and improvements, which will be hereinafter described at length, are concerned principally with the lighting means for the meridian dial, the mechanism for subjecting the patient's eyes to a color test, the mechanism for rotating the chart elements and centering each rotatable chart element prior to its rotation, the switches which control the electrical circuits and finally in the means for effecting adjustment of the blades of the meridian dial.

These several improvements will be hereinafter described in detail, and will be illustrated in the accompanying drawings. It will be appreciated, however, that they are disclosed by way of example only and that numerous changes in design and arrangement of the parts may be made without departing from the spirit and scope of the invention.

In the drawings:

Figure 1 is a front elevation of the eye testing apparatus;

Figure 2 is a front elevation of the apparatus with the face plate removed;

Figure 3 is a horizontal section on line 3—3 of Figure 1;

Figure 4 is a horizontal section on line 4—4 of Figure 1;

Figure 5 is a vertical section thru the apparatus, taken on line 5—5 of Figure 1;

Figures 8, 9, 10, 11, 12, 13 and 14 are enlarged views of details; and

Figure 15 is a diagram of circuits thru the illuminating lamps.

Figure 6:
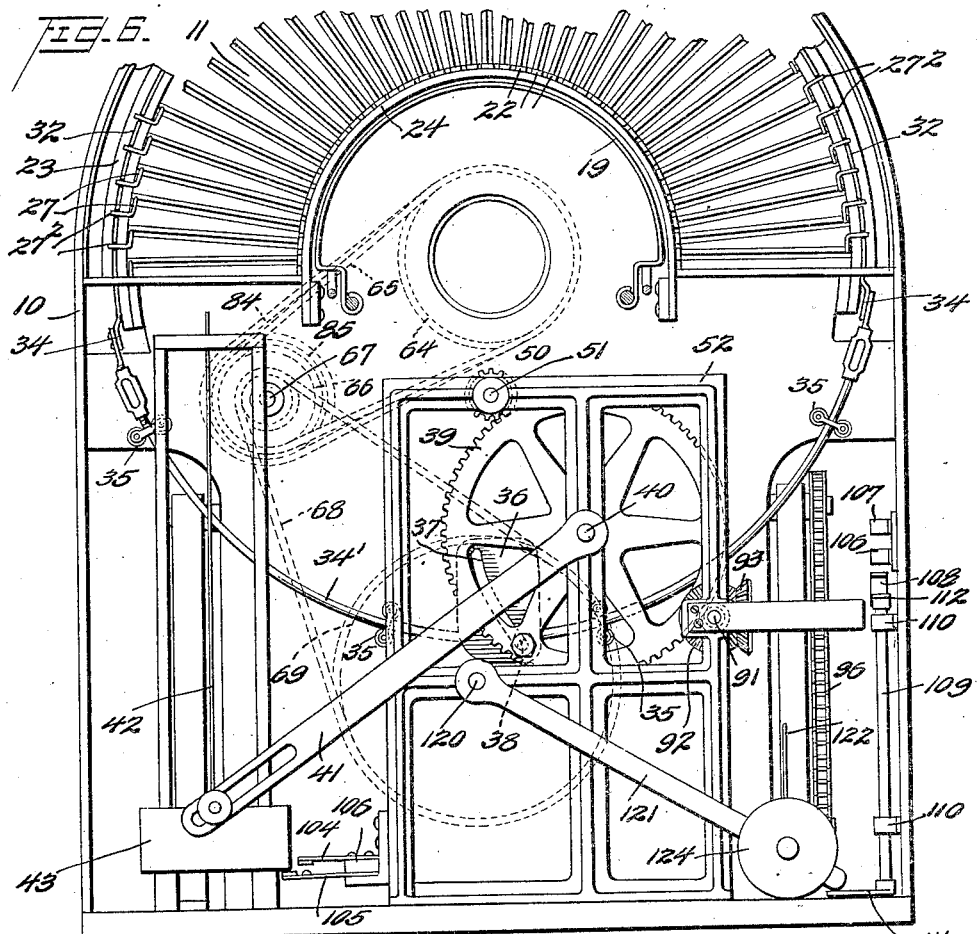
Figure 6 is a section on line 6—6 of Figure 5, partly broken away.

In general, as has been previously pointed out, the apparatus is quite similar to that disclosed at length in my co-pending application, Serial No. 589,463, and for that reason many of its details will be hereinafter only briefly described. The casing 10, for instance, in which the entire mechanism is housed, is substantially identical with that fully described in my co-pending application. It is unnecessary, therefore, to describe in this specification the exact construction of such casing. The meridian dial, visible thru the semicircular view aperture in the upper portion of the casing, the astigmatic chart, a portion of which is visible thru the central circular view aperture in the casing, and the letter chart, which is visible thru the lower rectangular view aperture, are, as seen from the front of the instrument by the patient, exactly similar to the corresponding elements of the eye testing apparatus described in my co-pending case. These elements are likewise operated in the same manner and hence it will only be necessary in the present case to describe the actual mechanical changes or improvements without setting forth at length the theory and manner of operation of the entire apparatus.

Referring particularly to Figure 2, it will be seen that the meridian or astigmatic dial is indicated generally at 11, the rotatable disc which supports the series of astigmatic charts at 12 and the letter chart at 13. The blades of the meridian dial radiate from a common center, which center is likewise the center of the uppermost chart element 14 when this chart element is centrally positioned in the view aperture 15. The axis of each blade makes an angle of 5° with the axis of the adjacent blade on each side, there being thirty-seven blades in all. These blades are constructed as fully described and illustrated in my Patent No. 1,507,715 with the exception of the means for effecting the relative movement of the two parts of which the blades are constructed. The set of blades is visible thru the view aperture 16 and appear sharply defined to the view inasmuch as they stand out in silhouette against a field 17 illuminated by means of a lamp 18. In my prior application the field behind the blades is shown to be an inclined plate and three illuminating lamps are utilized. I have found that better results are obtained with the field disposed vertically, as shown in Figure 5 and when a single centrally arranged lamp is used. The light shields 19, which are adjustable fore and aft of the apparatus are the same as described in my first filed application.

As before pointed out each blade of the meridian dial is formed in two portions mounted to swing or rotate about a common axis, as shown most clearly in Figures 9, 10 and 11. In other words the individual blades are "openable and closable" so as to appear to an observer or patient watching the apparatus, to vary in width. The groove between the two portions of each blade is toward the observer and, inasmuch as the illuminating light or field is on the opposite side of the blade, it is apparent that no light can be reflected from the blade surface to the observer's eye. In my prior patent each portion of each blade is provided at one end with the segment of a pinion and these segments mesh with a common operating member having suitable toothed or rack portions. Movement of this operating member effects rotation of both pinion segments simultaneously and hence results in the movement of the blade sections thru equal distance but in opposite directions. It is possible with such a construction for the pinions to wear in usage and to ultimately render the mechanism slightly inaccurate. In the present invention the pinion segments and racks are dispensed with and to the end of each portion of each blade is secured a rod-like member which engages in a slot in the operating member with practically no lost motion, the construction being such that the possibility of inaccuracy due to wearing of the parts are practically eliminated.

Thus in Figures 9, 10 and 11 it will be seen that each blade-section 20 is provided at its upper and lower ends with disc or washer-like members 21 and 22 respectively, disc member 21 fitting closely against the upper supporting segment 23 and disc 22 having a reduced cylindrical portion which lies within a correspondingly formed aperture in segment 24. Portion 25 of each blade is provided at its lower end with a spindle-like extension 26 which extends thru a correspondingly formed central aperture in disc-like member 22 and at its upper end is provided with an arm 27 having a longitudinally extending portion 27' coaxial with spindle 26 which portion extends not only thru disc 21 but also thru segment 23. Blade portion 25 is provided with a laterally extending arm 28 having an up-turned end portion 28', arm 28 extending in a direction generally opposite to that of arm 27 of the associated blade portion. Arm 27 is likewise up turned at its outer end as at $27^2$, the up-turned portions $27^2$ and 28' of arms 27 and 28 lying within slots 29 and 30 respectively of the operating member 31. This operating member comprises two spaced curved plates 32 and 33 connected together at their ends by cross members 34 so as to be movable as one piece. It can be seen, therefore, that movement of operating member 31 longitudinally of the segmental rest 23 will effect similar rotation of arms 27 and 28 in opposite directions and hence angular movement of the two portions of each blade in opposite directions and thru equal angles. By such means, therefore, the blades may be caused to vary in width, as seen from the front by a patient or observer.

Figure 7:
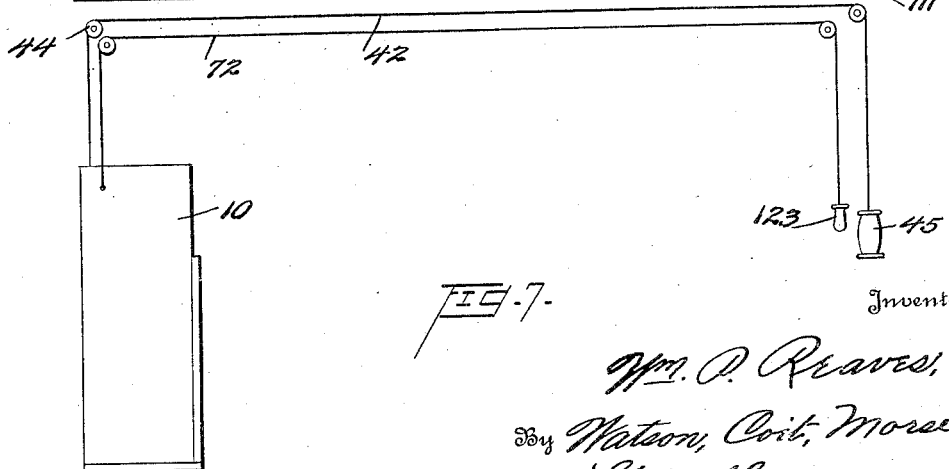
Figure 7 is a side view of the apparatus showing the means for controlling its operation from a distant point.

The end cross pieces 34 of operating member 31 are connected together by means of a semicircular rod 34' which rod is supported on rollers 35. Circumferential movement of the rod is effected by means of a cam device comprising a plate 36 (see also Figure 12) mounted on the rod and provided with a cam slot 37 into which extends the shank of a bolt 38 which is rigid with a gear wheel 39 fast on a short shaft 40. An arm 41, also fast on shaft 40, may be raised by a cord or cable 42 and allowed to fall under the influence of a weight 43 connected to this arm thru a pin and slot connection. Cord 42 passes upwardly thru an opening in the top of the casing and thence over pulleys 44 (Figure 7) to a point in front of the apparatus where it is provided with an operating handle 45 by means of which the examining physician may raise or drop arm 41, thereby widening or narrowing the blades of the meridian dial at his pleasure.

Meshing with the teeth of gear 39 is a pinion 50 fast on a shaft 51 rotatably mounted in the same frame 52 which supports shaft 40. Shaft 51 has fixed thereon at its forward end the disc 12 which supports a plurality of disc-like chart frames 54. Rotation of shaft 51 therefore occurs simultaneously with the operation of the meridian dial, and, as the disc moves about its pivotal axis, any one of the five rotatable chart elements 56, supported on annular frames 54, may be brought into register with the circular view aperture 15.

As pointed out in my co-pending application the letters or objects portrayed on the chart elements 56 vary in value as measured in visual acuity units and each chart, when in register with the view aperture, preferably has its lines or other inscribed elements of the same value as the blades of the meridian dial in its then adjustment, as measured in visual acuity units. This series of chart elements therefore cooperates with the meridian dial in eye testing. It is furthermore desired that means be provided for rotating each chart element about its central axis after it has been brought into register with view aperture 15. In my co-pending application I describe a "pick-up" device or a make and break connection by means of which each chart so positioned may be rotated. In my present invention this "pick up" has been eliminated.

Thus each rotatable frame 54, (see Figure 5) which is mounted upon roller bearings 57 for practically frictionless movement, is provided at its rear end with a toothed wheel 58 and all five such toothed wheels mesh with a central gear 59 loosely mounted on shaft 51. Gear 59 is rigidly connected by a hub with a second gear 60 likewise rotatable on shaft 51 and this second gear is in constant mesh with a gear 61 on a composite sleeve member 62 rotatably mounted upon a cylindrical stationary sleeve 63 coaxial with the view aperture 15. Rotatable sleeve 62 also includes a sprocket 64 engaged by a chain 65 (Figure 8). Chain 65 also runs over a gear or sprocket 66 mounted on shaft 67. Shaft 67 is connected by chain 68 and sprocket 69 to a rotatable shaft 120 which may be revolved by means of a lever 121 fixed thereon and arranged to be lifted by means of a cord 122 and handle 125 (Figure 7) and lowered by the influence of weight 124. Lifting of lever 121 therefore will cause rotation of shaft 120, shaft 67, sprocket 64, gear 61, gears 60 and 59, and hence of the chart elements supporting frames 54. All of these frames will be simultaneously rotated but the rotation of only one will be visible.

During rotation of disc 12 it will likewise be apparent that the frames 54 will be in rotation, these frames being in constant mesh with gear 59 which, during rotation of shaft 51, will be stationary. The arrangement of gears is such, however, that when any one of the frames 54 is exactly coaxial with the view aperture 15 the lines on the corresponding chart element 56 will be exactly vertically and horizontally disposed or disposed in some other predetermined position. Because of the difficulty of bringing any one of the selected chart elements 56 into exact register with the view aperture a correcting means is provided for bringing such selected chart element into theoretically correct position prior to its rotation on its own axis by the mechanism just described.

This correcting mechanism is shown in detail in Figure 8. In Figure 5 it will be observed that shaft 51 is provided in rear of gear 60 with a member 70 fixed thereon, which member is provided with a plurality of rollers 71. In Figure 8 it will be observed that member 70 has five flat sides of the same length, the edge of this member adjacent each of the chart elements being normal to a line passing thru the center of such chart element and the axis of shaft 51. The rotatable sleeve-like member mounted upon the stationary sleeve 63 includes, in addition to gear 61 and sprocket 62 an annular member 73 which member has one flat face 74, clearly shown in Figure 8.

Members 73 and 70 are in the same transverse plane and are so disposed relatively to each other that member 73 cannot be rotated, to rotate the chart elements, unless one chart element is exactly in alignment with the view aperture 15. Thus if the member 70, or "star wheel" is in any position other than that in which it is shown in Figure 8, the corner 75 of the member 73, that is the angle between the flat surface 74 of this member and its cylindrical surface, will strike the plate 76 which lies substantially horizontally on the then uppermost flat face of member 70. The inner end of this plate is free to move and its outer end is pivoted at 77 to the frame. In the rotation of shaft 51 the star wheel 70 passes freely under plate 76, this plate being lifted or rotated upwardly about its pivotal axis 77 as the rollers on the corners of the star wheel successively pass thereunder. It is obvious from an inspection of Figure 8 that if the star wheel should be rotated slightly in either direction from the position shown that one of the rollers would elevate the plate 76 and so position it that the corner 75 of the annular member 73 could not pass the same. If, however, power is supplied to the annular member 73 by means of the chain 65 the corner 75 will press downwardly on plate 76 which in turn will cause this plate to rotate the star wheel 70 slightly and hence the shaft 51 and the disc 53. By such means, therefore, the disc is caused to move so that the selected chart element 56 is exactly aligned with the view aperture. When so positioned the member 73 may be freely rotated and hence the charts revolved on their independent axes as before explained.

A disc 80 (see Figure 5) having a series of translucent lenses or pieces of colored glass 81 is rotatably mounted upon a stationary sleeve 82 which fits closely within the view aperture 15. This disc is provided with a sprocket 83 connected by a chain 84 (Figure 6) to a sprocket 85 likewise fixed on shaft 67. Disc 80 is thereby rotated simultaneously with chart element 56 and the colored glass 81 successively presented to the smaller view apertures 87 for testing the patient's ability to discern these colors.

It has previously been pointed out that by means of lever arm 41 the blades of the astigmatic dial, or meridian dial 11, are regulated, and the disc supporting the chart elements 56 rotated. Movement of this arm further effects vertical movement of the letter chart 13. The large gear 39 which is rotated when the arm 41 is moved also meshes with a pinion 90 on a short shaft 91 which shaft is connected by means of bevel gears 92 and 93 with a short shaft 94 having a sprocket 95 over which runs a chain 96 which drives the upper and lower rollers 97 and 98 respectively of the lower chart. It is apparent therefore, that the meridian dial, astigmatic chart, and roller chart are simultaneously operated by a movement of operating lever 41. The purpose of effecting such simultaneous movement or adjustment is fully brought out in my co-pending application, in which similar simultaneous movement of these elements is effected by a specifically different means.

The roller chart is illuminated by one or more electric lights 100 and the color lenses or glasses 81 are illuminated by two lights 101. From a consideration of Figure 15 it will be seen that none of these lights are lighted when the main switch 102 is closed but that an additional switch is provided in the circuit which includes the main light 18 and the chart light 100 and an additional switch in that circuit includes the color lights 101. The switch which controls the lighting of the main and chart lights is diagrammatically shown at 103 in Figure 15 and shown in detail in Figure 6. Thus, in Figure 6 the switch is seen to comprise a stationary contact 104 and a movable contact 105. The movable contact is a spring contact and is normally held downwardly by the weight 43 so that the lighting circuit is open. It is seen, however, as lever 41 is raised the lower contact 105 is free to swing upwardly, which it does, closing the circuit thru the main light 18 and the chart light 100. This switch therefore insures that the lights are not turned on except when the operator is conducting a test.

Operation of the lever 121 effects the operation of the switch which controls the color lights 101. As can be seen from Figure 15 the color lights are in parallel switch controlled circuits. The stationary contacts 106 and 107 of the switches are spaced apart and a single movable contact 108 is provided which may be caused to close either one or both circuits. In Figure 6 the contacts 106, 107 and 108 are illustrated and it will be seen that the movable contact 108 is mounted upon the upper end of a rod 109 slidably supported in brackets 110 secured to the frame. At its lower end the rod is provided with a transverse extension or foot 111 and as lever 121 reaches the lower limit of its travel it strikes this foot 111 and draws the rod 109 downwardly, opening or breaking contact thru both circuits. Raising of lever 121 to a position slightly above the horizontal will result in its outer end striking a second flange or projection 112 of rod 109 to cause upward movement of this rod. It is obvious that the rod may be raised either a distance only sufficient to bring contacts 106 and 108 together or may be raised a further distance to also bring contacts 107 and 108 together so that either or both of the bulbs 101 are supplied with current. Once rod 109 is raised it will remain in its raised position until the end of lever 121 strikes and depresses the foot 111 and it is apparent therefore that the color lights will remain illuminated for all intermediate positions of lever 121 during the operation of the instrument.

From the foregoing description it is believed that the invention will be clear to one skilled in the art. Its details, and the design and construction of its component elements, may be varied to suit changes in shape and design of the apparatus and the invention is not limited in its scope to that embodiment which is set forth.

Having thus described the invention, what is claimed as new and desired to be secured by Letters Patent is:

1. Eye testing apparatus including in combination, a casing having a front plate provided with a plurality of view apertures, a disc rotatably supported on said front plate in rear thereof and disposed concentrically with respect to one view aperture, said disc supporting translucent color elements which will be successively brought into alignment with a second view aperture when the disc is rotated, so as to be visible from the front of said front plate, means for rotating said disc, and a stationary lighting means in rear of said disc for illuminating the same.

2. Eye testing apparatus including in combination, a casing having a front plate provided with a plurality of view apertures, a disc rotatably supported on said front plate in rear thereof and disposed concentrically with respect to one view aperture, said disc supporting translucent color elements which may be successively brought into alignment with a second view aperture when the disc is rotated, so as to be visible from the front of said front plate, means for rotating said disc, a stationary lighting means in rear of said disc for illuminating the same, a rotatable chart element in rear of said first mentioned aperture and means for simultaneously rotating the chart element and color disc.

3. Eye testing apparatus including in combination, a rotatable disc or support, a plurality of chart elements rotatably supported on the disc, means for rotating the disc, and means in constant connection with a chart element for rotating the same relatively to the disc when the disc is stationary.

4. Eye testing apparatus including in combination, a rotatable disc or support, a plurality of chart elements rotatably supported on the disc, means for rotating the disc, and means on constant connection with a chart element for rotating the same relatively to the disc when the disc is stationary, said means including a revoluble member normally stationary, and means for revolving said member.

5. Eye testing apparatus including in combination, a rotatable disc or support, a plurality of chart elements rotatably supported on the disc, means for rotating the disc, and means in constant connection with a chart element for rotating the same relatively to the disc when the disc is stationary, said means including a revoluble member mounted concentrically with the disc and in constant connection with said disc.

6. Eye testing apparatus including in combination, a rotatable chart, chart element supports rotatably mounted on said chart, each of said supports having a gear secured thereto, a revoluble gear mounted concentrically with said rotatable chart and meshing with each of chart element support gears, said revoluble gear being normally stationary but being adapted to be rotated at the will of the operator to rotate said chart element supports.

7. Eye testing apparatus, including in combination, a revoluble chart element supporting member, a plurality of chart elements mounted on said member so as to be rotatable about their individual axes, means to rotate one of said elements when said member is stationary and second means for preventing said first mentioned means from rotating any chart element unless the axis of such chart element is in a predetermined position.

8. Eye testing apparatus, including in combination, a revoluble chart element supporting member, a plurality of chart elements mounted on said members so as to be rotatable about their individual axes, means to rotate one of said elements when said member is stationary and second means for bringing the axis of a selected chart element to an exact predetermined position prior to its rotation by said first means.

9. Eye testing apparatus, including in combination, a revoluble chart element supporting member, a plurality of chart elements mounted on said member so as to be rotatable about their individual axes, means to rotate one of said elements when said member is stationary and second means for bringing the axis of a selected chart element to an exact predetermined position prior to its rotation by said first means, said second means including a member movable with said chart element supporting member and arranged to cooperate with said chart element rotating means.

10. Eye testing apparatus, including in combination a revoluble chart element supporting member, a plurality of chart elements mounted on said member so as to be rotatable about their individual axes, means to rotate one of said elements when said member is stationary, and second means for bringing the axis of a selected chart element to an exact predetermined position prior to its rotation by said first means, said second means including a wheel having flattened portions revoluble with said chart element supporting member, the flattened sides thereof cooperating with said chart element rotating means.

11. Eye testing apparatus including in combination a casing having view apertures, eye testing devices within the casing and positioned to be visible thru said apertures, electric lighting means within the casing for illuminating said devices, a control switch therefor, and means for simultaneously adjusting said test devices and closing said control switch, said means including a weighted lever the upward movement of which effects the closure of said control switch and the downward movement of which opens said control switch.

12. An astigmatic dial including in combination, a support, a plurality of blades mounted on the support and radiating from a common center, each blade being formed in two portions relatively rotatable about a common axis and means for simultaneously rotating said blade portions in opposite directions, said means including oppositely extending rod like members, one secured to each blade, and a common actuating bar for both members.

13. An astigmatic dial including in combination, a support, a plurality of blades mounted on the support and radiating from a common center, each blade being formed in two relatively movable portions, a rod member secured to each portion of each blade the two rod members of each blade extending in opposite directions, and a common operating element for simultaneously moving all of said rod members.

14. An astigmatic dial including in combination, a support, a plurality of blades mounted on the support and radiating from a common center, each blade being formed in two relatively movable portions, a rod member secured to each portion of each blade the two rod members of each blade extending in opposite directions, and a common operating element for simultaneously moving all of said rod members, said operating element being annular in form and rotatable about a fixed axis.

In testimony whereof I hereunto affix my signature.

WILLIAM P. REAVES.